Aug. 27, 1957     C. HERZOG     2,804,322
ROTARY ELEMENT AND SHAFT ASSEMBLY
Filed Nov. 23, 1954
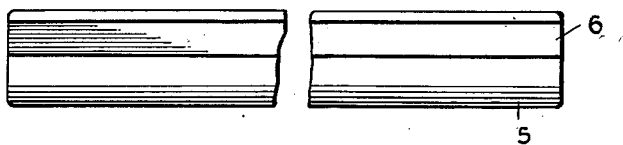
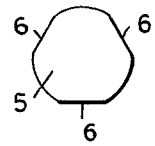
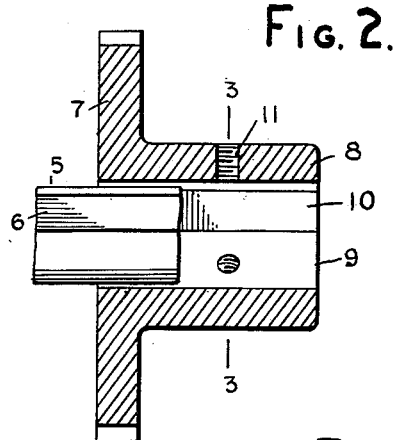
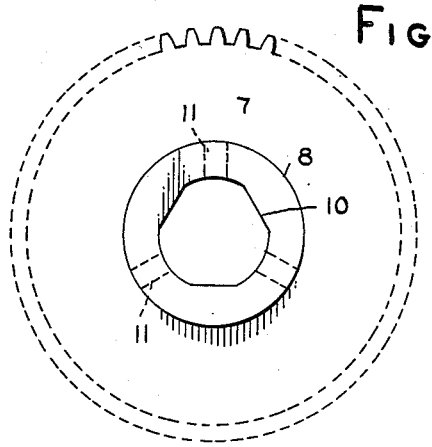
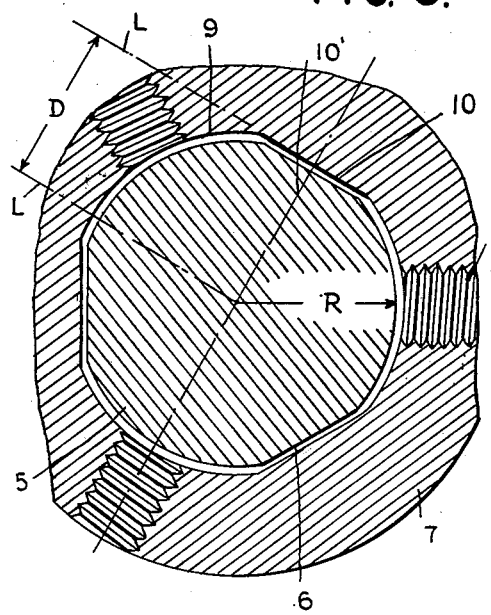
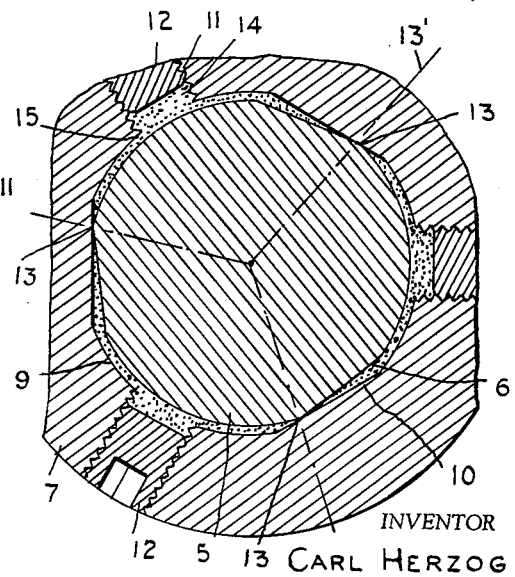
INVENTOR
CARL HERZOG
BY
ATTORNEY

2,804,322

ROTARY ELEMENT AND SHAFT ASSEMBLY

Carl Herzog, Long Beach, Calif.

Application November 23, 1954, Serial No. 470,688

4 Claims. (Cl. 287—52)

My invention relates to a rotary element and shaft assembly, and a method of forming the same.

The main object of the invention is to provide means for mounting a rotary element upon a shaft in such a fashion that perfect concentricity between them is obtained and maintained.

A further object of the invention is to provide means of the above-mentioned character, so constructed that cement may be employed to lock the rotary element and shaft together.

A further object of the invention is to provide means of the above-mentioned character including flats which may be accurately made, and which function to arrange the rotary element and shaft in perfect concentricity.

A further object of the invention is to provide means of the above-mentioned character which is particularly well adapted for use in assembling precision miniature gears and shafts, such as gears having one-eighth of an inch bore.

Other objects and advantages of the invention will be apparent during the course of the following description.

In the accompanying drawings forming a part of this application and in which like numerals are employed to designate like parts throughout same, Figure 1 is an enlarged side elevation of a shaft embodied in the invention, Figure 1a is an end elevation of the shaft, Figure 2 is an enlarged central vertical longitudinal section through the gear, the shaft being in elevation with parts broken away, Figure 2a is an end elevation of the gear, Figure 3 is a transverse vertical section, upon a greatly enlarged scale, parts broken away, through the hub of the gear and the shaft, before the shaft is turned with respect to the gear to effect the perfect concentricity between these parts, Figure 4 is a similar view, showing the shaft turned with respect to the gear to bring the parts into contacting concentricity, the parts being locked together by cement.

In the drawings, where for the purpose of illustration is shown a preferred embodiment of my invention, the numeral 5 designates a shaft which may have a small diameter, such as one-eight of an inch. This shaft is made truly cylindrically curved and is provided upon its periphery with longitudinal flats. These flats are identical in shape and size and are spaced identical distances from the center of their shaft and are equidistantly spaced. Since flats can be readily made identical and accurately arranged, they are employed for the present purposes.

The numeral 7 designates a rotary element or gear which has a hub 8 integral therewith. The hub has a truly cylindrically curved bore 9, which has flats 10, which flats are of identical shape and size, and are equidistantly spaced and are identical distances from the center of the bore 9. The bore 9 has a slightly larger diameter than the shaft 5. The flats 10 extend inwardly beyond the circumference of the cylindrical bore 9 and the flats 6 extend inwardly beyond the outer circularly curved face portions of the shaft 5. The radius R of the shaft 5 is longer than the distance D between the flats 10 and the center of the bore 9, as indicated by the parallel lines L.

The hub 8 is provided with screw-threaded openings 11, adapted to receive plugs 12.

In the practice of the method, the hub 8 is applied to the shaft 5, Figure 3, and the shaft is then turned counterclockwise, Figure 4. This brings the leading edges 13 of the shaft into contact with the flats 10 at identical corresponding points on the lines 13'. When this is done, it will be found that the shaft is truly concentric with the hub. It is desired that the concentricity be held within a tolerance of one-ten-thousandths of an inch (.0001). The shaft 5 may also be turned clockwise, to lock the parts together in true concentric relation. With the parts thus engaging, a cement 14 is introduced into the openings 11, and the plugs screwed into these openings. These plugs will force the cement into the spaces 15, between the hub and shaft. This cement will permanently lock the hub and shaft together into contacting concentric relation. There is now on the market a cement which will adhere to metal and harden without shrinking and has a high tensile strength. This cement is extensively used in the airplane industry in making wings for aircraft, by securing together aluminum sheets by means of this cement instead of by riveting, thereby saving considerable weight. This cement may be obtained on the market and is manufactured by Armstrong Products Co., Warsaw, Ind., under the name of Armstrong Cement A6.

Flats may be made readily and with accuracy, and for this reason, I employ them as the means to secure the concentricity between the gear and shaft. The same degree of accuracy could not be readily obtained by using contacting curved surfaces, nor could the same be obtained by using set screws or the like.

When the gear and shaft are brought into concentric relation by the use of the flats, these parts are permanently locked in this relation, by the cement which hardens and does not shrink.

The assembly must include the rotary element 7 having at least three flats 10, although this number may be increased. When the flats 6 are arranged opposite to the flats 10 and parallel therewith, the flats 6 and 10 are at right angles to radial lines 10' passing through their circumferential centers. The flats 6 are at the same radial distance from the center of the shaft 5 and the flats 10 are at the same radial distance from the center of the bore 9.

The invention is particularly useful with precision miniature rotary elements or gears and shafts. However, the size of these parts may be varied, and the invention is not necessarily restricted to the sizes given.

It is to be understood that the form of my invention herewith shown and described is to be taken as a preferred example of the same and that various changes in the shape, size and arrangement of parts may be resorted to, without departing from the spirit of my invention or the scope of the subjoined claims.

Having thus described my invention, I claim:

1. A method of securing a gear or the like to a shaft with a high degree of concentricity with the axis of the shaft, said gear having a bore larger than the diameter of the shaft and provided with a plurality of circumferentially equi-distantly spaced flats, the shaft having a corresponding number of circumferentially equidistantly spaced flats formed thereon, comprising inserting the shaft into said bore so that the flats of the shaft are disposed opposite the flats of said bore and spaced therefrom, causing relative rotational movement between the shaft and gear to establish points of contact between the flats of the shaft and gear and thereby rendering the gear concentric with the axis of the shaft, there being spaces formed between the periphery of said shaft and the bore between said points of contact, introducing hardenable liquid cement into said spaces while said points of contact are maintained, and applying pressure to the cement within the spaces while the same hardens to effect permanent securing of the gear to the shaft.

2. A method of permanently securing a rotary element to a shaft with a high degree of concentricity between said element and shaft, said element having a bore larger than the diameter of the shaft, said bore having a plurality of circumferentially equidistantly spaced flats, said element having a plurality of side openings formed therethrough between said flats, said shaft having a corresponding number of circumferentially equidistantly spaced flats formed thereon, comprising the steps of inserting the shaft into said bore so that the flats of the shaft are disposed opposite the flats of said bore and spaced therefrom, effecting relative rotational movement between said element and shaft for establishing points of contact between the flats of the element and shaft and thereby rendering the element concentric with the axis of the shaft, there being spaces between the periphery of the shaft and said bore between said points of contact, said spaces communicating with the side openings, introducing hardenable liquid cement into said spaces through the side openings while said points of contact are maintained, and applying pressure to the cement within the side openings to cause the cement to completely fill said spaces and maintaining the pressure while the cement hardens to complete the permanent connection between said element and shaft.

3. A method of permanently securing a rotary element to a shaft with a high degree of concentricity, said element having a bore larger than the diameter of the shaft, said bore having a plurality of circumferentially equidistantly spaced faces formed thereon, said faces being spaced a lesser radial distance from the axial center of said element than the surface of said bore, said element having a plurality of generally radial openings formed therethrough between said faces and opening through said bore, said shaft having a corresponding number of circumferentially equidistantly spaced faces formed thereon for coaction with the first-named faces, comprising the steps of inserting the shaft through said bore and arranging said faces of the shaft and bore opposite each other, effecting relative rotational movement between said element and shaft for establishing points of contact between the faces of the bore and shaft and thereby rendering the element concentric with the shaft, there being peripheral spaces between said shaft and bore between said points of contact, said spaces communicating with said radial openings, introducing hardenable liquid cement into said radial openings and spaces while the points of contact are maintained, and applying external pressure to the cement within the radial openings to assure that said spaces are completely filled with cement and maintaining the pressure while the cement hardens to thereby complete the permanent connection between the element and shaft.

4. A method of permanently securing a rotary element to a shaft with a high degree of concentricity between said element and shaft, said element having a bore larger than the diameter of the shaft, said bore having a plurality of circumferentially equidistantly spaced flats, said element having a plurality of side openings formed therethrough between said flats, said shaft having a corresponding number of circumferentially equidistantly spaced flats formed thereon, comprising the steps of inserting the shaft into said bore so that the flats of the shaft are disposed opposite the flats of said bore and spaced therefrom, effecting relative rotational movement between said element and shaft for establishing points of contact between the flats of the element and shaft and thereby rendering the element concentric with the axis of the shaft, there being spaces between the periphery of the shaft and said bore between said points of contact, said spaces communicating with the side openings, introducing hardenable liquid cement into said spaces through the side openings while said points of contact are maintained, and then introducing plugs into said side openings to compress the liquid cement for causing the cement to completely fill said spaces while the cement hardens and thus completing the permanent connection between said element and shaft.

References Cited in the file of this patent

UNITED STATES PATENTS

| | | |
|---|---|---|
| 1,424,211 | Pugh | Aug. 1, 1922 |
| 2,173,942 | Hiatt et al. | Sept. 26, 1939 |
| 2,493,233 | Dower | Jan. 3, 1950 |
| 2,609,963 | Watson et al. | Sept. 9, 1952 |
| 2,651,531 | Smith | Sept. 8, 1953 |
| 2,678,853 | Reeder | May 18, 1954 |